US007735720B2

(12) United States Patent
Nelson

(10) Patent No.: US 7,735,720 B2
(45) Date of Patent: Jun. 15, 2010

(54) METHOD AND SYSTEM FOR MANUAL AUTHORIZATION

(75) Inventor: David O. Nelson, West Jordan, UT (US)

(73) Assignee: American Express Travel Related Services Company, Inc., New York, NY (US)

(*) Notice: Subject to any disclaimer, the term of this patent is extended or adjusted under 35 U.S.C. 154(b) by 69 days.

(21) Appl. No.: 12/194,493

(22) Filed: Aug. 19, 2008

(65) Prior Publication Data

US 2008/0313064 A1 Dec. 18, 2008

Related U.S. Application Data

(63) Continuation of application No. 10/801,765, filed on Mar. 16, 2004, now Pat. No. 7,413,112.

(51) Int. Cl.
*G06F 17/00* (2006.01)

(52) U.S. Cl. ...................... 235/375; 235/380

(58) Field of Classification Search ................ 235/375, 235/376, 379, 380; 705/39–41
See application file for complete search history.

(56) References Cited

U.S. PATENT DOCUMENTS

| | | | |
|---|---|---|---|
| 3,719,927 A | 3/1973 | Michels et al | |
| 4,491,725 A | 1/1985 | Pritchard | |
| 4,594,663 A | 6/1986 | Nagata et al. | |
| 4,734,564 A | 3/1988 | Boston et al. | |
| 4,812,628 A | 3/1989 | Boston et al. | |
| 4,891,503 A | 1/1990 | Jewell | |
| 4,916,611 A | 4/1990 | Doyle, Jr. et al. | |
| 5,036,461 A | 7/1991 | Elliott et al. | |
| 5,070,452 A | 12/1991 | Doyle, Jr. et al. | |
| 5,210,687 A | 5/1993 | Wolfberg et al. | |
| 5,301,105 A | 4/1994 | Cummings, Jr. | |
| 5,621,201 A | 4/1997 | Langhans et al. | |
| 5,631,828 A | 5/1997 | Hagan | |
| 5,649,116 A | 7/1997 | McCoy et al. | |
| 5,708,422 A * | 1/1998 | Blonder et al. ............. 340/5.41 |
| 5,710,887 A | 1/1998 | Chelliah et al. | |
| 5,715,403 A | 2/1998 | Stefik | |
| 5,724,424 A | 3/1998 | Gifford | |
| 5,732,400 A | 3/1998 | Mandler et al. | |
| 5,748,908 A | 5/1998 | Yu | |
| 5,757,917 A | 5/1998 | Rose et al. | |
| 5,758,327 A | 5/1998 | Gardner et al. | |

(Continued)

FOREIGN PATENT DOCUMENTS

EP 0072183 2/1983

(Continued)

OTHER PUBLICATIONS

Phillips, Stephen- "Case Study—Orbiscom and Cyota", Sep. 5, 2001, download from http://specials.ft.com/ftit/sept2001/FT3D4SI86RC.html on Mar. 26, 2009, © 2001, The Financial Times.

(Continued)

*Primary Examiner*—Daniel St.Cyr
(74) *Attorney, Agent, or Firm*—Snell & Wilmer L.L.P.

(57) ABSTRACT

Embodiments provide systems, apparatus, methods, computer program code, and means for performing manual authorizations.

17 Claims, 7 Drawing Sheets

U.S. PATENT DOCUMENTS

| | | | |
|---|---|---|---|
| 5,781,632 A | 7/1998 | Odom | |
| 5,790,677 A | 8/1998 | Fox et al. | |
| 5,797,133 A | 8/1998 | Jones et al. | |
| 5,798,508 A | 8/1998 | Walker et al. | |
| 5,822,737 A | 10/1998 | Ogram | |
| 5,825,881 A | 10/1998 | Colvin, Sr. | |
| 5,826,241 A | 10/1998 | Stein et al. | |
| 5,826,245 A | 10/1998 | Sandberg-Diment | |
| 5,832,447 A | 11/1998 | Rieker et al. | |
| 5,850,446 A | 12/1998 | Berger et al. | |
| 5,864,829 A | 1/1999 | Tago | |
| 5,883,810 A | 3/1999 | Franklin et al. | |
| 5,890,137 A | 3/1999 | Koreeda | |
| 5,914,472 A * | 6/1999 | Foladare et al. | 235/380 |
| 5,945,653 A | 8/1999 | Walker et al. | |
| 5,953,710 A | 9/1999 | Fleming | |
| 5,956,700 A | 9/1999 | Landry | |
| 5,991,750 A | 11/1999 | Watson | |
| 6,000,832 A | 12/1999 | Franklin et al. | |
| 6,006,205 A | 12/1999 | Loeb et al. | |
| 6,014,650 A | 1/2000 | Zampese | |
| 6,029,890 A | 2/2000 | Austin | |
| 6,052,675 A | 4/2000 | Checchio | |
| 6,128,603 A | 10/2000 | Dent et al. | |
| 6,163,771 A | 12/2000 | Walker et al. | |
| 6,169,974 B1 | 1/2001 | Baumgartner et al. | |
| 6,193,155 B1 | 2/2001 | Walker et al. | |
| 6,226,624 B1 | 5/2001 | Watson | |
| 6,227,447 B1 | 5/2001 | Campisano | |
| 6,324,526 B1 | 11/2001 | D'Agostino | |
| 6,327,578 B1 | 12/2001 | Linehan | |
| 6,330,544 B1 | 12/2001 | Walker et al. | |
| 6,339,766 B1 | 1/2002 | Gephart | |
| 6,360,209 B1 | 3/2002 | Loeb et al. | |
| 6,453,296 B1 | 9/2002 | Iwamura | |
| 6,456,984 B1 | 9/2002 | Demoff et al. | |
| 6,493,685 B1 | 12/2002 | Ensel et al. | |
| 6,598,031 B1 | 7/2003 | Ice | |
| 6,636,833 B1 | 10/2003 | Flitcroft et al. | |
| 6,748,367 B1 | 6/2004 | Lee | |
| 6,901,387 B2 | 5/2005 | Wells et al. | |
| 6,955,294 B1 * | 10/2005 | Seegar | 235/380 |
| 7,006,994 B1 | 2/2006 | Campbell et al. | |
| 7,117,172 B1 * | 10/2006 | Black | 705/35 |
| 7,413,112 B2 * | 8/2008 | Nelson | 235/375 |
| 2001/0007098 A1 | 7/2001 | Hinrichs et al. | |
| 2001/0011222 A1 | 8/2001 | McLaughlin et al. | |
| 2001/0029473 A1 | 10/2001 | Yamaoka et al. | |
| 2001/0032192 A1 | 10/2001 | Putta et al. | |
| 2001/0034702 A1 | 10/2001 | Mockett et al. | |
| 2001/0034720 A1 | 10/2001 | Armes | |
| 2001/0037312 A1 | 11/2001 | Gray et al. | |
| 2001/0042784 A1 | 11/2001 | Fite et al. | |
| 2001/0047310 A1 | 11/2001 | Russell | |
| 2001/0047330 A1 | 11/2001 | Gephart et al. | |
| 2001/0047335 A1 | 11/2001 | Arndt et al. | |
| 2001/0047336 A1 | 11/2001 | Maycock, Jr. et al. | |
| 2001/0051917 A1 | 12/2001 | Bissonette et al. | |
| 2001/0051924 A1 | 12/2001 | Uberti | |
| 2002/0007320 A1 | 1/2002 | Hogan et al. | |
| 2002/0035548 A1 | 3/2002 | Hogan et al. | |
| 2002/0059146 A1 | 5/2002 | Keech | |
| 2002/0065774 A1 | 5/2002 | Young et al. | |
| 2002/0073045 A1 | 6/2002 | Rubin et al. | |
| 2002/0077977 A1 | 6/2002 | Neely et al. | |
| 2002/0091646 A1 | 7/2002 | Lake et al. | |
| 2002/0116327 A1 * | 8/2002 | Srinivasan | 705/38 |
| 2002/0120587 A1 | 8/2002 | D'Agostino | |
| 2002/0133467 A1 | 9/2002 | Hobson et al. | |
| 2002/0161701 A1 * | 10/2002 | Warmack | 705/39 |
| 2002/0174030 A1 | 11/2002 | Praisner et al. | |
| 2003/0018567 A1 | 1/2003 | Flitcroft et al. | |
| 2003/0028481 A1 | 2/2003 | Flitcroft et al. | |
| 2003/0101145 A1 * | 5/2003 | Fang et al. | 705/64 |
| 2003/0110136 A1 | 6/2003 | Wells et al. | |
| 2003/0125969 A1 * | 7/2003 | Kizer et al. | 705/1 |
| 2004/0078328 A1 | 4/2004 | Talbert et al. | |
| 2004/0148254 A1 | 7/2004 | Hauser | |
| 2004/0210531 A1 * | 10/2004 | Barron et al. | 705/44 |
| 2004/0230536 A1 | 11/2004 | Fung et al. | |
| 2005/0240522 A1 | 10/2005 | Kranzley et al. | |
| 2006/0206425 A1 | 9/2006 | Sharma | |
| 2007/0005498 A1 | 1/2007 | Cataline et al. | |

FOREIGN PATENT DOCUMENTS

| | | |
|---|---|---|
| EP | 0745961 | 12/1996 |
| EP | 1029311 | 6/2001 |
| EP | 1115095 | 7/2001 |
| JP | 10143556 | 5/1998 |
| WO | WO9930294 | 6/1999 |
| WO | WO9949424 | 9/1999 |
| WO | WO0049586 | 8/2000 |
| WO | WO0062259 | 10/2000 |
| WO | WO0129637 | 4/2001 |
| WO | WO 03/069531 A1 | 8/2003 |
| WO | WO03069531 | 8/2003 |

OTHER PUBLICATIONS

Notice of Allowance; U.S. Appl. No. 08/957,419; Jun. 29, 1999.
Notice of Allowance; U.S. Appl. No. 09/276,289; Jan. 12, 2000.
Notice of Allowance; U.S. Appl. No. 09/276,289; Feb. 22, 2001.
Notice of Allowance; U.S. Appl. No. 10/064,151; Nov. 26, 2004.
Notice of Allowance; U.S. Appl. No. 11/005,593; Oct. 3, 2006.
Notice of Allowance; U.S. Appl. No. 10/801,765; Jun. 25, 2008.
Phillips, Stephen: "Case Study—Orbiscom and Cyota", Sep. 5, 2001, download from http://www.cyota.com.viewCyotaNews.cfm?id=41 on Apr. 24, 2002, Copyright 2001, The Financial Times, 2 pgs.
Office Action in U.S. Appl. No. 11/005,593 dated Sep. 13, 2005.
Office Action in U.S. Appl. No. 11/005,593 dated Feb. 24, 2006.
Office Action in U.S. Appl. No. 11/005,593 dated Jul. 24, 2006.
Office Action in U.S. Appl. No. 11/653,108 dated Nov. 1, 2007.
Office Action in U.S. Appl. No. 11/653,108 dated Jan. 13, 2009.
Notice of Allowance in U.S. Appl. No. 11/653,108 dated May 7, 2009.
Office Action in U.S. Appl. No. 10/724,940 dated Jul. 29, 2008.
Final Office Action in U.S. Appl. No. 10/724,940 dated Dec. 1, 2008.
Advisory Action in U.S. Appl. No. 10/724,940 dated Feb. 24, 2009.
Notice of Allowance in U.S. Appl. No. 10/724,940 dated Apr. 22, 2009.
Office Action in U.S. Appl. No. 10/391,689 dated Oct. 23, 2007.
Final Office Action in U.S. Appl. No. 10/391,689 dated Jun. 12, 2008.
Office Action in U.S. Appl. No. 10/391,689 dated Dec. 1, 2008.
Office Action in U.S. Appl. No. 10/391,689 dated Jun. 11, 2009.
Office Action in U.S. Appl. No. 10/801,765 dated Nov. 30, 2005.
Office Action in U.S. Appl. No. 10/801,765 dated May 19, 2006.
Office Action in U.S. Appl. No. 10/801,765 dated Dec. 22, 2006.
Office Action in U.S. Appl. No. 10/801,765 dated Apr. 11, 2007.
Office Action in U.S. Appl. No. 10/801,765 dated Oct. 30, 2007.
Final Office Action in U.S. Appl. No. 10/801,765 dated Mar. 17, 2008.
Notice of Allowance in U.S. Appl. No. 10/801,765 dated Jun. 25, 2008.
Office Action in U.S. Appl. No. 12/194,493 dated Jul. 24, 2009.
Office Action in U.S. Appl. No. 11/643,722 dated Apr. 7, 2008.
Final Office Action in U.S. Appl. No. 11/643,722 dated Oct. 31, 2008.
Advisory Action in U.S. Appl. No. 11/643,722 dated Jan. 28, 2009.
Office Action in U.S. Appl. No. 11/643,722 dated Mar. 12, 2009.
Notice of Allowance in U.S. Appl. No. 11/643,722 dated Aug. 10, 2009.

* cited by examiner

METHOD AND SYSTEM FOR MANUAL AUTHORIZATION

CROSS-REFERENCE TO RELATED APPLICATIONS

This application is a continuation of, and claims priority to, U.S. Ser. No. 10/801,765 filed Mar. 16, 2004 (now U.S. Pat. No. 7,413,112 issued on Aug. 19, 2008), which is hereby incorporated by reference in it entirety.

FIELD OF INVENTION

The present invention relates generally to financial data processing techniques. More particularly, embodiments of the present invention relate to transaction authorization techniques.

BACKGROUND OF THE INVENTION

Payment cards, such as credit cards and debit cards, are increasingly used in financial transactions. They are particularly widely used in consumer transactions, and are increasingly used in business-to-business transactions. Payment card transactions are simple and efficient: a buyer (referred to herein as a "client" or "cardholder") provides a supplier (referred to herein as a "merchant") with an account identifier associated with a payment card to purchase desired item(s). In a typical credit card transaction, the merchant verifies that the cardholder has adequate funds available against his line of credit by submitting an "authorization request" to a processor responsible for authorizing transactions involving the credit card. A positive authorization results in the generation of an authorization code and ensures that the bank that issued the credit card will pay the merchant the transaction amount. That is, for a typical credit card transaction, the transaction is authorized if the card is valid and sufficient finds or credit exist.

Many types of payment cards impose additional controls. For example, many payment cards such as "corporate cards", "T&E cards", "purchasing cards" are associated with corporate- and account-level controls that define where, and how, the cards may be used (these cards will be collectively referred to herein as "purchasing cards" for simplicity). For example, an organization may issue purchasing cards to some or all of its employees. To ensure that each employee's spending is appropriately controlled, each of the cards can be issued with it's own spending limits, tailored to the authority of each employee. Further controls may be imposed to control each employee's total spending by day or by month, the type of merchant each card may be used at, one or more retail spending limit(s), dollar limit(s), limits on cash advances, etc.

Generally, these card controls are enforced during the transaction authorization process. For example, when a merchant submits an authorization request for a transaction involving a purchasing card, the purchasing card account is checked to ensure that the account is valid and funded in substantially the same way as the typical credit card authorization is performed as described above. In addition, account control information is also retrieved and compared to the transaction information provided in the authorization request. If the transaction information does not comply with all of the relevant account control information, the transaction is declined.

Some account issuers provide an ability to override such a decline. Unfortunately, the typical process is cumbersome and time consuming. The cardholder generally calls a customer service number of the issuer, and is then referred to an administrator who then again contacts the issuer. The issuer reviews the cardholder's corporate- and account-level limitations and information. A note is associated with the account to allow for a manual authorization once the merchant telephones the issuer for authorization. The issuer contacts the administrator informing them to instruct the cardholder to re-present the card and to have the merchant telephone the issuer for approval. The transaction is approved if the merchant telephones the issuer and if the information provided by the merchant match the information included in the note associated with the account. This process is both cumbersome and time consuming, requiring manual intervention by the client, the issuer and the merchant, all of which can lead to dissatisfaction with the card program.

It would be desirable to provide an improved method to manually authorize transactions, particularly transactions that were previously declined.

DETAILED DESCRIPTION

Figure 1:
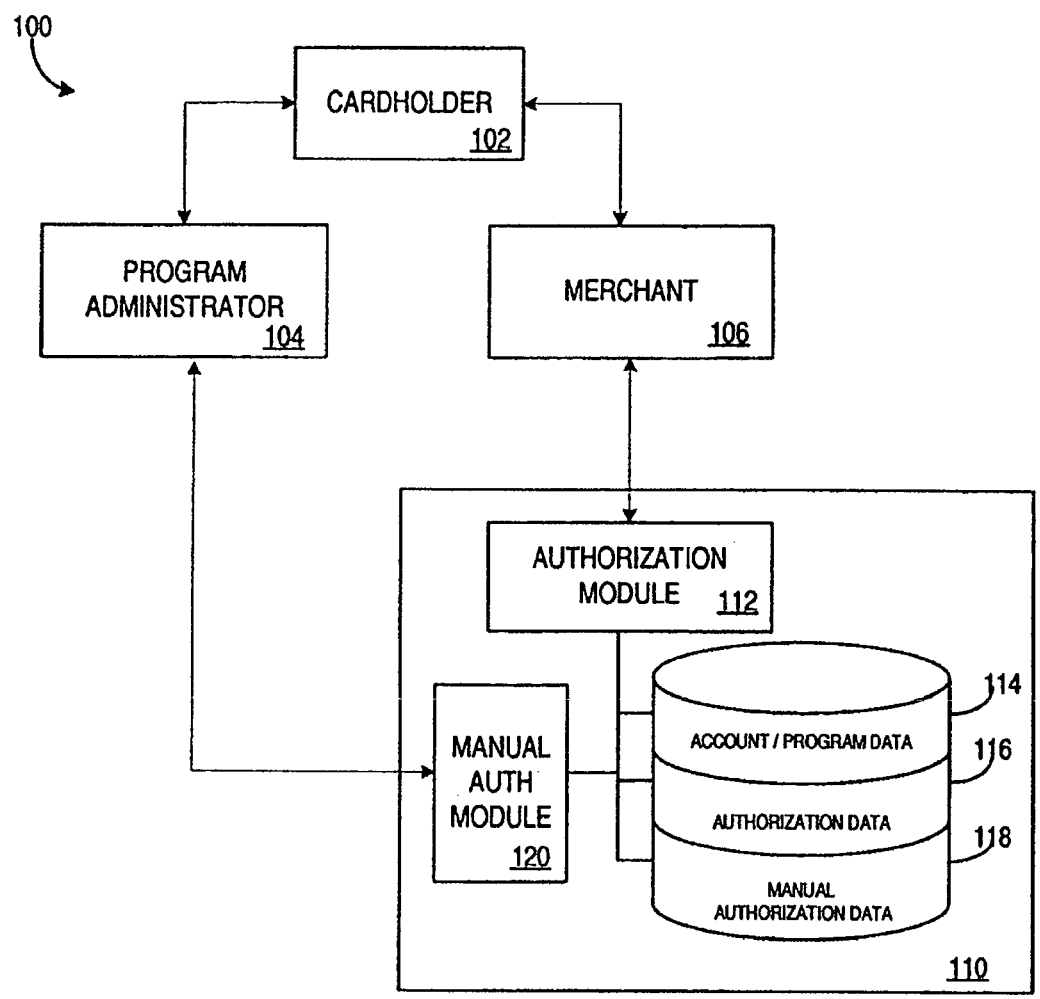
FIG. 1 is a schematic diagram of an exemplary system according to some embodiments.

To alleviate problems inherent in the prior art, embodiments of the present invention provide systems, methods, apparatus, computer program code and means for manually authorizing a transaction are provided. Pursuant to some embodiments, previously declined payment card transactions may be authorized by an account manager so that a subsequent transaction involving the same payment card may be authorized and completed. Pursuant to some embodiments, information from the declined transaction is used to create a manual authorization record associated with the payment card. A subsequent transaction using the payment card will be authorized if the terms of the transaction comply with the parameters in the manual authorization record.

With these and other advantages and features of the invention that will become hereinafter apparent, the nature of the invention may be more clearly understood by reference to the following detailed description of the invention, the appended claims and to the several drawings attached herein.

INTRODUCTORY EXAMPLE

Prior to embarking on a detailed description of features of the present invention, a brief illustrative example will be presented. In this illustrative example, a financial institution ("Bank") has issued a number of purchasing cards to employees of a company ("Company"). All of the purchasing cards are associated with individual credit accounts, each representing obligations of Company. To minimize the potential for misuse of the purchasing cards, Company has established a number of corporate-level purchasing controls for the program. For example, none of Company's purchasing cards may be used to make purchases at certain blocked merchant categories (as defined by specific or a range of merchant category codes or "MCCs").

Further, Company has established a number of account-level purchasing controls associated with each individual purchasing card. For example, certain purchasing cards are associated with controls allowing them to be used only at certain types of travel or entertainment merchants (again, as defined by specific or a range of MCCs). Other purchasing cards are associated with controls allowing them to be used for transactions involving low dollar amounts. Each of the account-level controls are enforced on a transaction-by-transaction basis in response to authorization requests submitted by a merchant. These corporate- and account-level controls are commonly used in existing purchasing card programs. Company has adopted features of embodiments of the present invention, and appoints an employee to act as a program administrator ("PA"). PA is given the ability to access and view authorization data associated with the Company's purchasing cards (including information associated with transactions that were previously declined). This authorization data may be reviewed substantially in real-time (e.g., substantially at the same time as the data is generated). Further, PA has been given the authority and ability to create a manual authorization record based on a declined transaction.

One of the Company employees ("Employee") has been issued a purchasing card that includes controls that prohibit her from using the card at merchants other than travel and entertainment merchants. Employee is on a business trip on behalf of Company and, in an emergency, needs to rent a computer to make a presentation at an important client. Unfortunately, the computer rental merchant's MCC is not an authorized MCC and the authorization request submitted from the computer rental company to the issuer returns with a "decline". In order to rent the computer, Employee contacts PA and describes the situation. PA operates a computer connected to the Internet and directs the computer's Web browser to a URL associated with a manual authorization server operated on behalf of the purchasing card issuer. PA interacts with the manual authorization server to view recent transactions associated with Employee, and retrieves information associated with the declined transaction record (including details of the failed transaction at the computer rental merchant).

PA uses this transaction record to create a manual authorization record involving Employee's purchasing card and the computer rental company and informs Employee that she can now use her card to rent the computer rather than modifying the existing corporate- and account-level controls and exposing Company to additional risk. The computer rental company again generates an authorization request for the rental transaction and the transaction is now approved, despite the corporate- and account-level controls imposed on Employee's account. The computer rental company's subsequent authorization request is only approved if it identically complies with the terms of the manual authorization record. Once the subsequent authorization request is approved, the manual authorization record is terminated. The existence of the manual authorization record will not prevent Employee from using her card in other transactions (e.g., she may use it to make T&E purchases which otherwise comply with the corporate- and account-level controls associated with her account). In this manner, Company is able to establish relatively stringent corporate- and account-level controls while enjoying the ability to quickly recover from situations where employees are unable to use their cards for transactions that should be authorized. Further features of embodiments will become apparent upon review of the following detailed description.

Terms

For convenience, a number of terms are used herein. For example, as used herein, the terms "account number" or "account identifier" are used to refer to an alphanumeric string used to identify a financial account such as a payment card account against which funds may be charged or debited when the account identifier is presented for payment by a holder (or authorized user) of the account. In some embodiments, an account identifier is a credit or debit card account identifier which may be, for example, formatted in a manner that allows the issuer of the account to be identified and which may be routed over existing payment card networks. For example, the account identifier may be a 16-digit MasterCard® formatted account identifier, a 15-digit American Express® formatted account identifier, etc., each of which includes a "bank identification number" or "BIN" that allows the issuer of the account to be identified. In some embodiments, the account identifier is issued to a cardholder by embossing, printing, or storing the account identifier on a physical transaction card (e.g., such as a typical magnetic stripe card or smart card). In some embodiments, the account identifier is a virtual identifier not necessarily associated with a physical transaction card (e.g., such as for use in conducting remote or Internet transactions).

Pursuant to some embodiments, individual account identifiers may be associated with a "manual authorization record". The terms "manually authorized" and "manual authorization record" are generally used herein to refer to data associated with an account identifier that specifies the conditions in which a transaction associated with the account will be authorized. For example, in some embodiments, manual authorization data may be used to specify any term of a transaction including, for example, the transaction amount, merchant, MCC, SIC, date, etc.

As used herein, the term "client" or "cardholder" is used to refer to an individual or entity (such as a corporation or other purchasing entity) which is authorized to use, or has been issued, an account identifier.

As used herein, the term "program administrator" is used to refer to an individual or entity responsible for or otherwise entitled to create manual authorization records for one or more payment card accounts. For example, a typical corporate purchasing card program may have a number of different program administrators.

System

Features of embodiments will now be described by first referring to FIG. 1 in which a transaction system 100 is shown. As shown, transaction system 100 includes interaction between a cardholder 102 wishing to purchase goods or services from a merchant 106 using a payment card.

Cardholder 102 presents the payment card (or, in some embodiments, simply provides an account identifier) to merchant 106 for use in purchasing goods or services from the merchant. In some embodiments, the presentation of an account identifier to a merchant is performed in an automated or semi-automated process (e.g., when the client operates procurement software or systems that are capable of interacting with merchant sales or catalog software systems). In some embodiments, the presentation of the payment card to a merchant is performed in a manual or semi-automated process (e.g., a client may present a physical payment card having the account identifier encoded or embossed on it to the merchant, etc.).

The payment card is associated with an account identifier identifying a payment card account associated with an issuer and/or issuer agent or processor 110 (for simplicity, referred to as the processor 110). Processor 110 may operate, be associated with or otherwise be in communication with an authorization module 112 which interfaces with one or more merchants 106 to receive and transmit authorization information associated with payment card accounts. Processor 110 may also operate, be associated with, or otherwise be in communication with a manual authorization module 120 which interfaces with one or more program administrator devices 104 to receive manual authorization data for payment card accounts. Manual authorization module 120 may be in direct or indirect communication with program administrator devices 104. For example, pursuant to some embodiments, some or all program administrator devices 104 may interact with manual authorization module 120 through an intermediary system or device such as a company's purchasing system.

Processor 110 may be operated by or on behalf of a bank and provide payment card processing, billing, reporting and settlement and operational services to acquiring and issuing banks. Many banks do not perform their own payment card processing and contract with third party processors to perform the processing. For example, entities such as Total Systems Services, Inc.® and First Data Resources, Inc.® operate payment card processing services on behalf of many different financial institutions. In some embodiments, processor 110 may receive transaction information directly from merchant 106. Those skilled in the art will appreciate that in some embodiments, processor 110 receives transaction information through an intermediary such as an acquirer or merchant acquirer (not shown). Transaction information may be routed to processor 110 using information contained in (or associated with) the account identifier presented to the merchant for payment.

Processor 110 includes authorization module 112 which receives authorization request messages and data from merchants, analyzes the messages and data, and responds with authorization response messages either approving or denying transactions. Authorization module 112 receives data from merchants via a communication interface that may be, for example, a payment card network interface. For example, authorization module 112 may receive authorization requests from merchants via a payment card network operated by or on behalf of a payment card association such as Visa International Service Association® or MasterCard International® Authorization module 112 may interface with other types of networks as well, including existing proprietary or closed networks or proprietary, closed, or open payment card networks developed in the future. In general, any network that transmits payment card authorization request and authorization response messages between a merchant and a processor or authorization system may be utilized.

Processor 110 also includes manual authorization module 120 that allows interaction between processor 110 and one or more program administrators 104 to send and receive manual authorization information associated with payment card accounts. For example, manual authorization module 120 may be configured to act as (or in conjunction with) a Web server, allowing program administrators 104 operating computing devices to interact with processor 110 to view authorization data and to establish manual authorization records for payment card accounts.

Pursuant to some embodiments, program administrator devices 104 may be operated by or on behalf of an individual, entity or organization that desires to control the authorizations of its payment card accounts. Pursuant to some embodiments, a client (or an authorized representative of the client, such as a program administrator operating device 104) interacts with processor 110 or other entity to establish a manual authorization record associated with the account identifier. The manual authorization record is used to ensure that a subsequent transaction involving a payment card will be authorized, despite the fact that the transaction was previously declined for the same transaction. Further, in some embodiments, the manual authorization record may be used to ensure that a transaction is not declined in the first place (e.g., the manual authorization record overrides payment card controls that would otherwise cause the transaction to be declined).

Processor 110 is also shown as storing, or having access to, a variety of items of data pursuant to some embodiments of the present invention. For example, as depicted, processor 110 stores or has access to account and program data 114, authorization data 116, and manual authorization data 118. For example, account and program data 114 may be or include data identifying the status and conditions associated with individual payment accounts serviced by processor 110. For example, for each payment card account serviced by processor 110, data may be stored or accessed identifying general account information (e.g., account number, expiration information, balance, outstanding payments, etc.), as well as any usage conditions associated with the account.

For example, if the payment card is a purchasing card, it may be associated with corporate-level and account-level usage conditions. These conditions may be stored or accessed by processor 110 and used to make authorization decisions. For example, conditions may include: merchant category code (MCC) or standard industrial code (SIC) limitations (such as included or excluded MCCs or SICs), single purchase limits, daily purchase limits, merchant limits (such as included or excluded merchant IDs), velocity limits, country or geographical limits, etc. In general, any conditions commonly used or available to control transactions may be utilized with embodiments of the present invention.

Authorization data 116 may be or include data associated with prior authorization request and responses processed by processor 110. For example, authorization data 116 may include a separate data record for each individual transaction authorized or declined by processor 110. This information may be segregated or stored separately for different groups of payment card accounts. For example, the information may be segregated or stored separately for each issuer. The information may instead (or additionally) be segregated or stored separately for each organization or entity. For example, authorization data for all of the purchasing cards issued to a company may be stored in a manner allowing ready retrieval by an authorized user (e.g., such as individuals appointed to act as program administrators for the entity).

Authorization data 116 may include, for example: the payment card account identifier, the date and time of the transaction, the amount, the merchant identifier, the MCC or SIC, the acquiring bank, and an identification of whether the transaction was authorized or declined. If the transaction was authorized, a transaction identifier or authorization code may also be associated with the transaction information. If the transaction was declined, further information may also be provided indicating the reasons for the decline.

Manual authorization data 118 may be or include data associated with individual authorization records established pursuant to embodiments of the present invention. Manual authorization data 118 may include, for example, information identifying a payment card account identifier and other information identifying specific conditions under which a specific transaction using the payment card will be authorized. Manual authorization data 118 may include information such as a transaction amount, a start and end date, and other user-defined data that a program administrator may specify to provide an explanation regarding the manual authorization record. Pursuant to some embodiments, manual authorization data 118 may be used to authorize a transaction that would otherwise be (or which previously was) declined based on corporate- or account-level conditions associated with the account. The creation and use of manual authorization data 118 will be described further below.

Some or all of the devices and systems depicted in FIG. 1 may be computing devices. For example program administrator device 104 may be a computing device such as a personal computer, a workstation, a network terminal, a network server, a hand-held remote access device, a personal digital assistant (PDA) or any other device or combination of devices that can perform functions allowing interaction and control of transaction information. Processor 110 may operate one or more computing systems or networks of computing systems to perform processing, including authorization processing and manual authorization processing.

Similarly, merchant 106 may operate one or more computing devices and/or point of sale devices configured to perform sales operations and transmit and receive authorization requests and messages to processor 110. Any of a number of computing devices or point of sale devices may be used, so long as authorization requests and responses may be transmitted and received.

As depicted, for the purpose of illustration, transaction system 100 shows a single client, a single merchant, etc. interacting to conduct a transaction. Those skilled in the art will recognize that transaction system 100 may have a number of participants. For example, one or more issuer(s) may issue accounts to a number of cardholders 102. Each cardholder 102 may purchase goods or services from one or more merchant(s) 106. Each issuer may operate as, or interact with, one or more processors 110 to process transactions involving payment card accounts of the issuer. Each processor 110 may operate or interact with one or more authorization and manual authorization modules, and may interact with one or more program administrators operating program administrator devices 104.

Each of the entities, devices and systems of FIG. 1 may communicate over one or more communication networks, such as, for example, local area networks (LANs), wide-area networks (WANs), intranets, the Internet, an extranet, a wireless network, or any other form of computer network. Some interactions may be performed over existing bankcard networks such as the bankcard networks established and operated by or on behalf of MasterCard® or Visa International Service Association® Different networks may be involved in different portions of a purchase transaction.

As an example, in an illustrative transaction, cardholder 102 may interact with merchant 106 over the Internet to place an order and to provide merchant 106 with an account identifier associated with an account of the client. Merchant 106 may then submit an authorization request over a bankcard network to processor 110. Program administrator 104 may interact with manual authorization module 120 over the Internet to view declined transactions and to establish a manual authorization for one or more of the declined transactions. These network examples are provided for illustrative purposes only; those skilled in the art, upon reading this disclosure, will recognize that other networks and combinations of networks may be used to facilitate interaction between participants of a transaction pursuant to the present invention.

Authorization Flow

Figure 2:
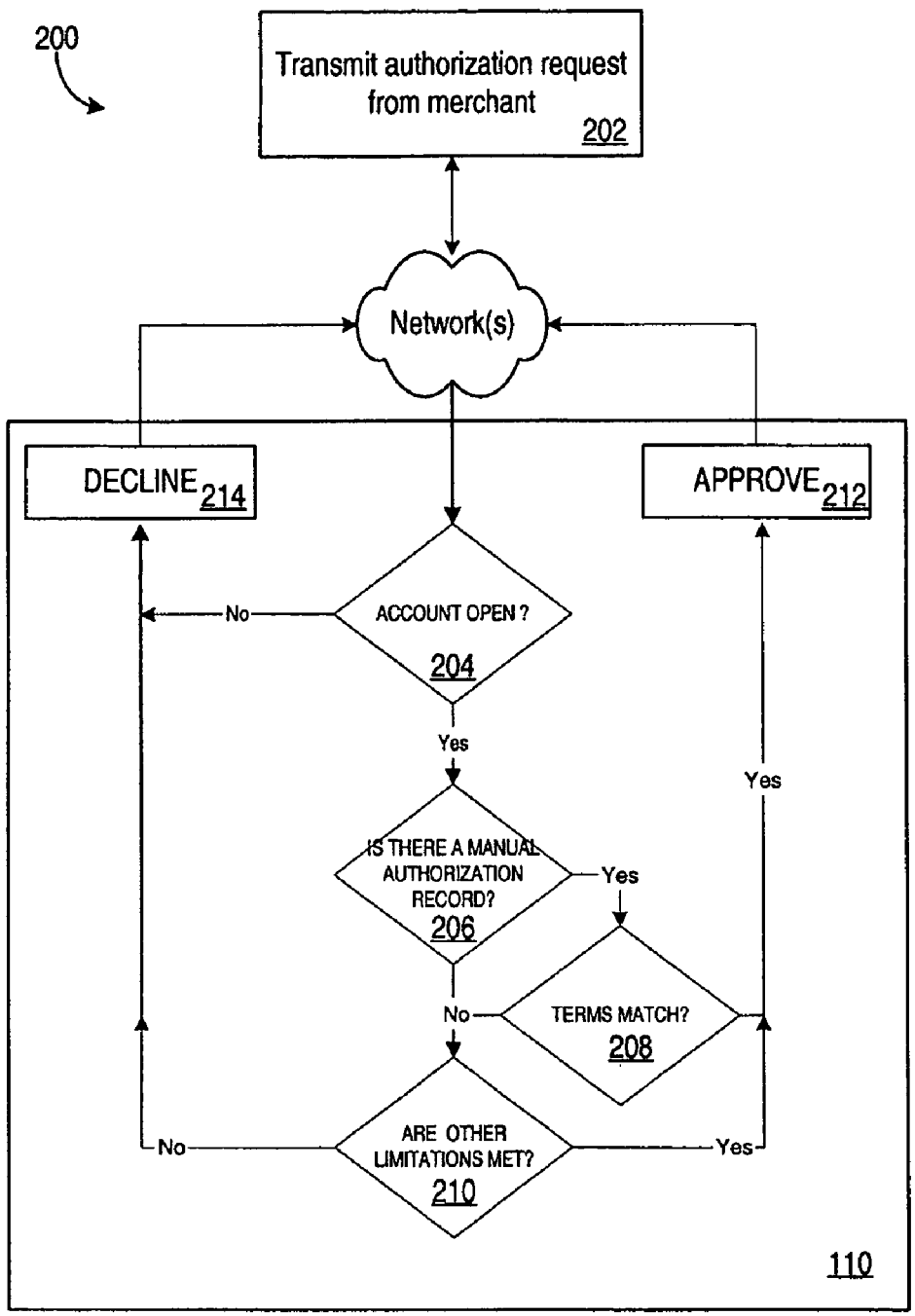
FIG. 2 is a schematic diagram of an exemplary authorization system and process according to some embodiments.

Reference is now made to FIG. 2, where a flow diagram depicting an illustrative authorization process 200 pursuant to some embodiments is shown. The flow charts described herein do not imply a fixed order to the steps, and embodiments of the present invention may be practiced in any order that is practicable.

Pursuant to some embodiments, manual authorization records or data are used to override or circumvent corporate- and account-level limitations associated with payment card accounts. Pursuant to some embodiments, manual authorization records are checked during the course of an authorization process performed by processor 110 in response to an authorization request received from a merchant. The authorization process 200 shown in FIG. 2 depicts an illustrative process commencing with the transmission of an authorization request from a merchant at 202. Those skilled in the art will appreciate that a number of different techniques may be used to generate and transmit the request at 202. For example, a merchant may operate a point of sale (POS) device connected to or in communication with a bankcard or other processing network. The POS device may generate and transmit the authorization request over the networks to processor 110. Those skilled in the art will recognize that the authorization request may be routed to the appropriate processor based, at least in part, on the account identifier associated with the payment card presented for the purchase.

After processor 110 receives the authorization request, processing continues at 204 where a determination is made whether the account identified by the received account identifier is open. If the account is not open (e.g., it has been closed by the issuer or by the cardholder, etc.), processing continues at 214 where processor 110 causes a "decline" response to be transmitted to the merchant. Processing at 214 also includes the creation of a transaction record associated with the account identifier, the transaction, and the authorization response. This transaction record may be, for example, stored in a database such as database 116 of FIG. 1.

If, however, processing at 204 indicates that the account is open, processing continues at 206 where a determination is made whether a manual authorization record has been created and associated with the account identifier. The manual authorization record identified at 206 may also be created, pursuant to some embodiments, in response to a prior declined transaction (e.g., as described in the Introductory Example above). Processing at 206 may include comparing the account identifier associated with the received authorization request with a table or database of account identifiers for which manual authorization records have been established.

If there is a match (that is, if a manual authorization record is associated with the account identifier), processing continues at 208 where a determination is made whether the terms of the transaction (as identified in the transaction request message) satisfy the terms of the manual authorization record. In some embodiments, an exact match of the entire record is required. For example, the manual authorization record may indicate a particular purchase amount and MCC that must be matched for an authorization request to be approved. If the proposed transaction terms comply with the limitations included in the manual authorization record, processing continues at 212 where the transaction is approved and an approval response is transmitted back to the merchant. Processing at 212 also includes the creation of a transaction record associated with the account identifier, the transaction, and the authorization response. In some embodiments, the record also includes a transaction code used to uniquely identify the transaction. This transaction record may be, for example, stored in a database such as database 116 of FIG. 1.

In some embodiments, processing at 206 includes an initial determination of the MCC or SIC or merchant ID associated with the requested transaction. In this manner, different manual authorization records may be established for different types of transactions using a single payment card.

If processing at 206 indicates that no manual authorization record has been created and associated with the account identifier, or if processing at 208 indicates that a manual authorization record has been created but not matched, processing continues to 210 where a determination is made whether other limitations are met. For example, processing at 210 may include identifying any corporate- or account-level limitations associated with the account identifier. Processing at 210 may also include comparing terms of the proposed transaction with any identified corporate- or account-level limitations to determine if the transaction should be approved. Processing at 210 may include determining whether the account has sufficient funds available (or spending authority) to complete the requested transaction. For example, processing at 210 may include determining whether any MCC blocks are associated with the account and, if so, determining whether the proposed transaction involves a merchant having one of the blocked MCCs. If other limitations associated with the account are met, processing continues at 212 where the transaction is approved. If other limitations are not met, processing continues at 210 where the transaction is declined.

That is, pursuant to some embodiments, the existence or non-existence of a manual authorization record is checked prior to determining whether corporate- or account-level limitations are met by a transaction. In this manner, embodiments allow authorized users to override corporate- or account-level limitations in order to allow a particular transaction to be authorized. Pursuant to some embodiments, previously declined transactions may be subsequently authorized using the same payment card.

Manual Authorization Flow

Figure 3:
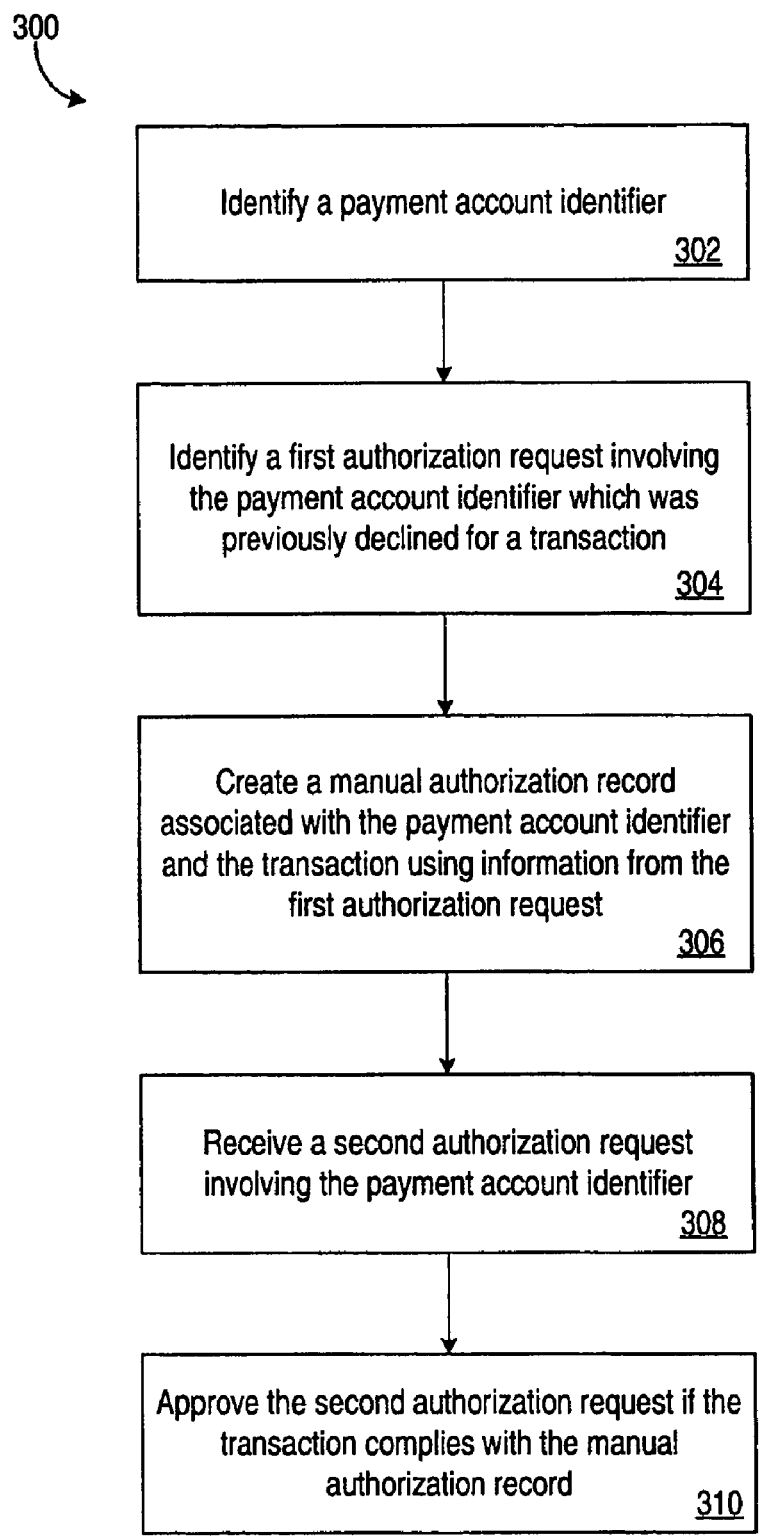
FIG. 3 is a flowchart depicting an exemplary process for performing manual authorizations pursuant to some embodiments.

Reference is now made to FIG. 3, where a flow diagram depicting an illustrative manual authorization process 300 pursuant to some embodiments is shown. Manual authorization process 300 includes identifying a payment account identifier at 302. For example, processing at 302 may involve a cardholder contacting a program administrator to complain that a transaction involving a payment card was declined. The cardholder may provide her payment account identifier to the program administrator, or the program administrator may look the identifier up from a database or listing of accounts. The program administrator may then identify the payment account identifier to processor 110 (e.g., via a user interface such as the user interface of FIG. 5, discussed below). Continuing the illustrative example introduced above, the Employee may telephone PA and request that the previously-declined transaction involving the computer rental merchant be manually authorized.

Processing continues at 304 to identify a first authorization request involving the payment account identifier which was previously declined for a transaction. For example, in some embodiments, a graphical user interface such as the interface depicted in FIG. 6 may be used to view data stored in authorization database 116. In this manner, a program administrator or other user can view declined transactions and select one or more particular declined transactions for further action. Again continuing the illustrative example, PA may interact with processor 110 to identify the declined transaction record associated with Employee's payment card and involving the computer rental merchant.

Once a first authorization request involving the account is identified, processing continues at 306 to create a manual authorization record associated with the payment account identifier and the transaction using information from the first authorization request. For example, in some embodiments, a program administrator may utilize a graphical user interface to interact with processor 110 to create a manual authorization record. In some embodiments, information may be automatically (or in a partially-automated fashion) taken or copied from the declined transaction record to create a manual authorization record stored in manual authorization database 118. In some embodiments, the program administrator may selectively enter or key in data to be associated with the manual authorization record. Continuing the illustrative example introduced above, PA may interact with processor 110 to create a manual authorization record associated with Employee's payment card which allows Employee to rent a computer from the computer rental merchant (despite the fact that Employee's payment card is not generally usable at merchants other than T&E merchants). PA may specify additional restrictions in the manual authorization record, including, for example, a period of validity of the manual authorization record.

Processing continues at 308 to receive a second authorization request involving the payment account identifier. That is, after the manual authorization record is associated with the payment account identifier, the account identifier is represented for the transaction. For example, after the record is established, PA may contact Employee and instruct her to retry the transaction. Alternatively, PA may directly contact the computer rental merchant and request that they retry the transaction.

Processing continues at 310 to approve the second authorization request if the transaction complies with the manual authorization record. That is, if the second authorization request includes terms that comply with the restrictions included in the manual authorization record, the subsequent transaction will be approved, even though the payment card has corporate- or account-level restrictions that are violated by the transaction. Using the illustrative example, Employee's second attempt to rent a computer from the computer rental merchant will be authorized if the merchant submits an authorization request that complies with the terms of the manual authorization record, even though Employee's card is not generally usable at merchants other than T&E merchants. In this manner, program administrators may efficiently, quickly, and accurately authorize subsequent transactions that were previously declined (while preserving corporate- and account-level controls associated with the account for use in other transactions).

User Interfaces

Reference is now made to FIGS. 4-7 where a series of user interfaces are shown pursuant to some embodiments. The interfaces may be displayed on display devices associated with, for example, computing devices operated by or on behalf of program administrator 104. Each of the user interfaces, for example, may be a Web page, a Web browser, or any other type of interface including a graphical user interface (GUI), which allows program administrator 104 (or other authorized users) to interact with manual authorization module 120 and/or processor 110. For example, manual authorization module 120 may control a Web page that enables the receiving of input from an Internet-connected program administrator device. In some embodiments, the interface is only provided to preauthorized users. Such a preauthorized user may be, for example, a designated program administrator having security authorization allowing access to the interface.

Figure 4:
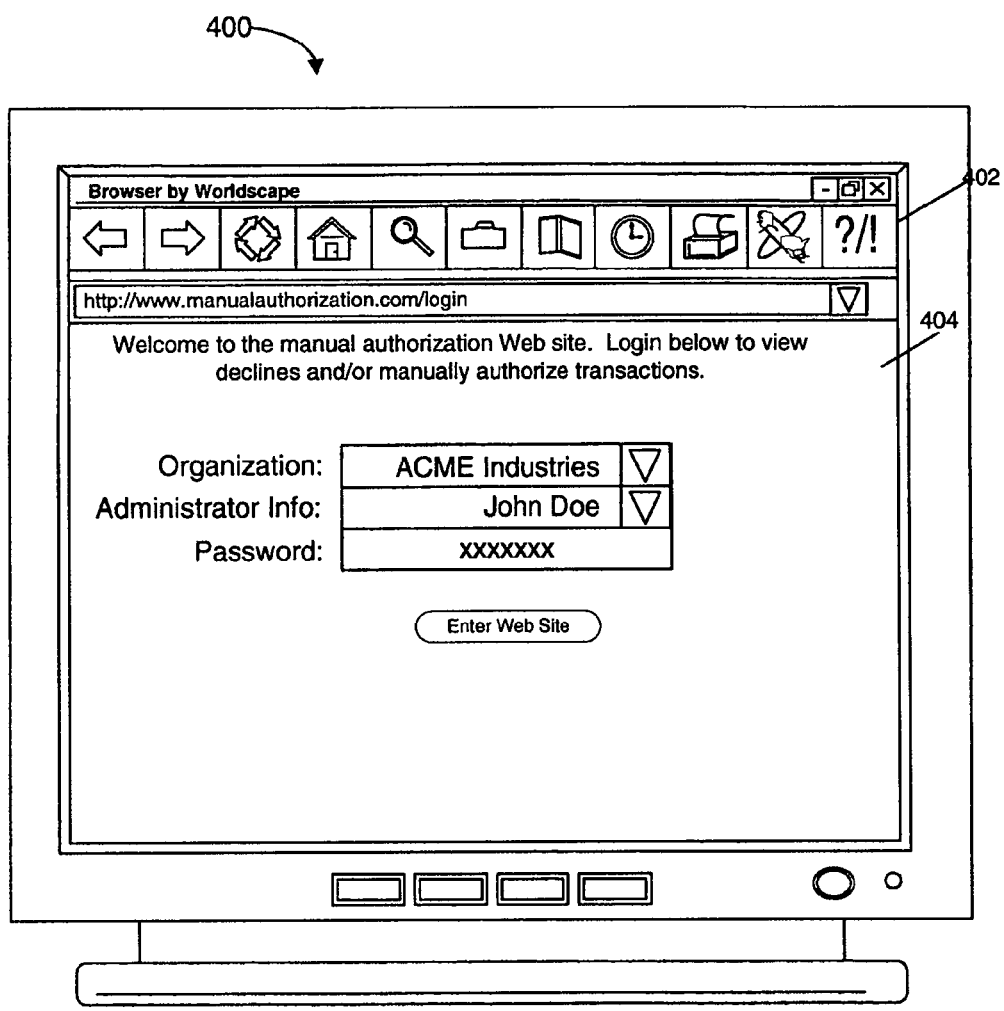
FIGS. 4-7 are exemplary user interfaces pursuant to some embodiments.

Reference is now made to FIG. 4, where a diagram of a user interface 400 pursuant to some embodiments is shown. The interface may be a Web page hosted by, for example, a manual authorization module 120. Program administrators 104 or other authorized users may access the Web interface by directing the Web browser 402 on their respective computing devices to the Uniform Resource Locator (URL) associated with the manual authorization module 120. The user interface 400 depicted in FIG. 4 represents an illustrative login screen that may be presented to a program administrator seeking to view authorization information and/or to manually authorize a transaction pursuant to embodiments of the present invention. As shown, the program administrator may be required to specify his or her organization, name, and password (although those skilled in the art will realize that other registration or log-in schemes may be used).

Figure 5:
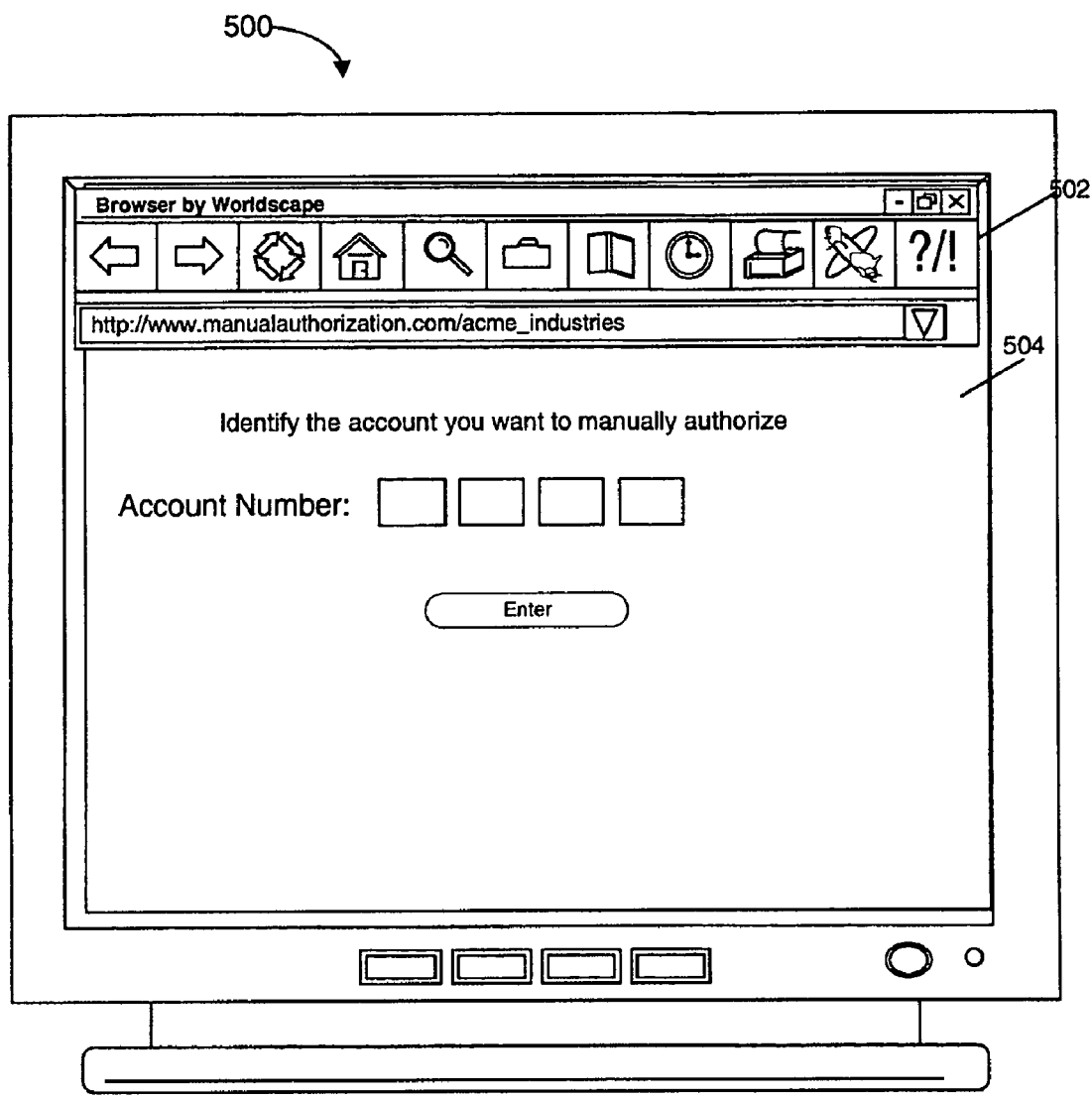

Referring now to FIG. 5, a further user interface 500 is shown which represents an illustrative interface that may be presented to a program administrator who has successfully logged in to the manual authorization system (e.g., by successfully interacting with the user interface of FIG. 4). In the user interface 500 of FIG. 5, the program administrator is asked to enter information identifying a specific account for which the administrator wishes to view authorization information and/or manually authorize. Those skilled in the art will appreciate that other types of interfaces may also be provided to allow a user to select accounts (e.g., drop down boxes or lists of accounts may be used, etc.).

Figure 6:
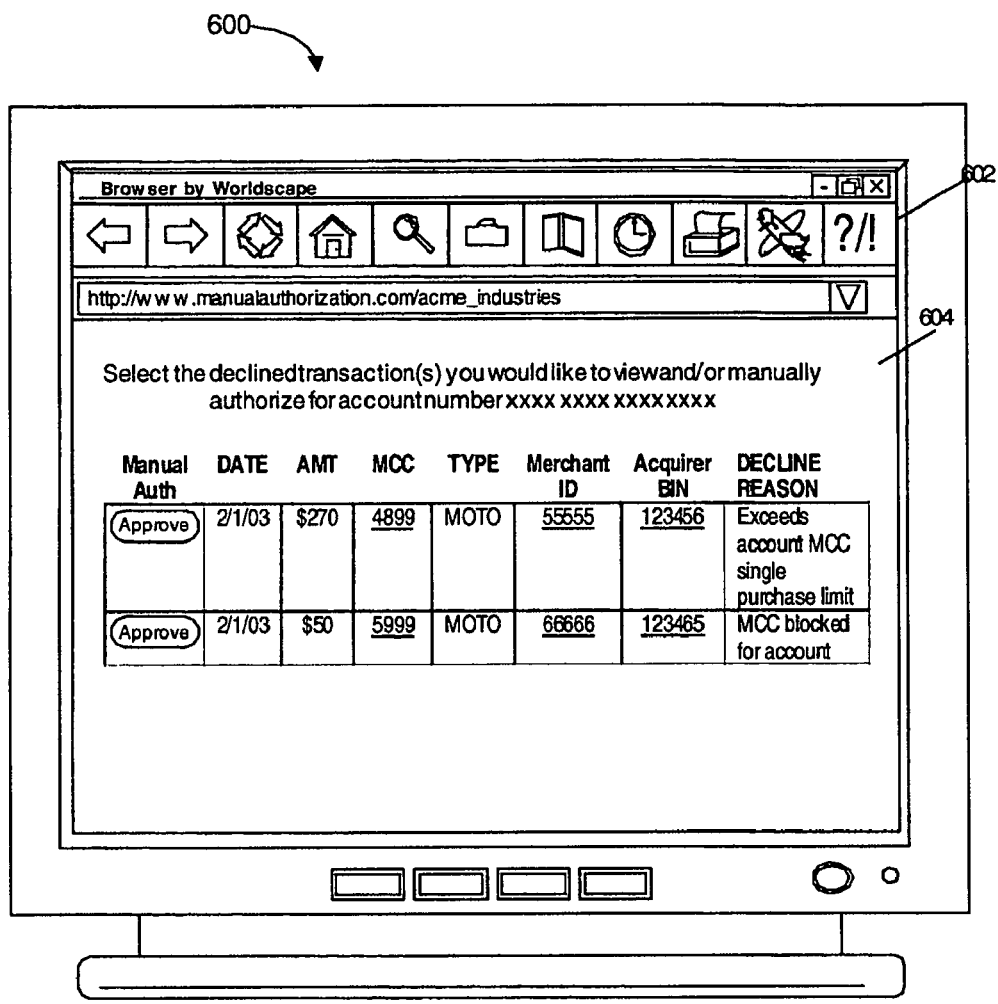
Figure 7:
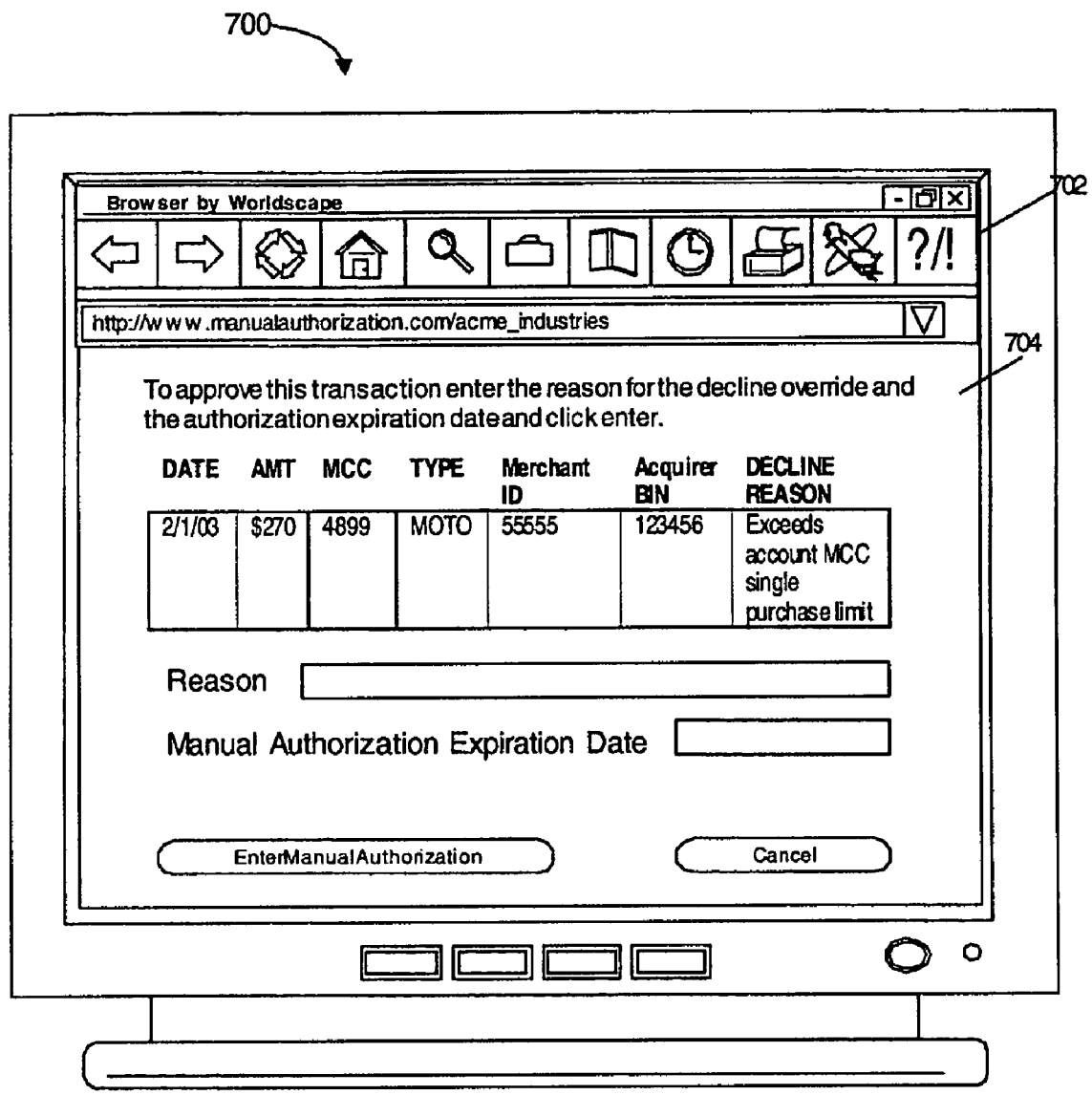

Referring now to FIG. 6, a further user interface 600 is shown which represents an illustrative interface that may be presented to a program administrator who has successfully logged in and who has selected a particular account. Interface 600 depicts information associated with two illustrative declined transactions associated with the selected account. Information about each of the declined transactions are displayed to allow the program administrator to review each of the transactions in detail. If the program administrator determines that one or more of the listed declines should have been authorized, he or she can simply select the declined transaction (shown, in this illustrative interface, as being performed by selecting an "Approve" icon under the column labeled "Manual Auth").

In the illustrated user interface 600, by selecting one or more declined transactions, and selecting "Approve", a program administrator can efficiently establish a manual authorization record that includes the terms of the declined transaction. For example, a subsequent user interface 700 (shown in FIG. 7) may be presented to the program administrator, allowing the program administrator to enter information associated with the decline override (e.g., such as explanatory information and/or an expiration date of the manual authorization). Once this information is entered, the program administrator may enter the authorization, causing the record to be stored in, for example, manual authorization data 118 associated with processor 110 and is used to authorize a transaction involving the account. Those skilled in the art will appreciate that other user interfaces may also be used. For example, additional user interfaces may be provided to allow a program administrator to selectively edit or add manual authorization terms (e.g., including a specific authorization timeframe, etc.).

A number of modifications to embodiments may be made. For example, in some embodiments, a program administrator or other authorized user may modify one or more terms of the authorization data to create a manual authorization record that is different than the initial authorization data. Those skilled in the art will appreciate that other modifications or variations may be made without departing from the spirit and scope of the present invention.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

The invention claimed is:

1. A method, comprising:
   identifying a first authorization request associated with a payment account, where said first authorization request was declined for a first purchase transaction for failing to comply with at least one of an account-level and a corporate-level use restriction associated with said payment account;
   creating, in response to said declined first authorization request, a manual authorization record for said payment account and said first purchase transaction based on information associated with or resulting from said first authorization request; and,
   temporarily overriding said at least one of an account-level and a corporate-level use restriction and allowing approval of a second authorization request involving said payment account and a second purchase transaction that complies with terms of said manual authorization record, including matching at least a portion of information from said first authorization request.

2. The method of claim 1, wherein said payment account is associated with a purchasing card issued to a purchasing entity having a program administrator.

3. The method of claim 2, wherein said manual authorization record is created in response to a request by said program administrator.

4. The method of claim 1, wherein said payment account is associated with at least one of merchant category code (MCC), account-level, a corporate-level, and standard industrial code (SIC) authorization controls.

5. The method of claim 4, wherein said first authorization request is declined based on a failure of said first purchase transaction to comply with at least one of said MCC, said account-level, said corporate-level, and said SIC authorization controls associated with said payment account.

6. The method of claim 4, wherein said manual authorization record operates to override at least one of said MCC, said account-level, said corporate-level, and said SIC authorization controls associated with said payment account.

7. An apparatus, comprising:
   a network interface communicating with a memory;
   the memory communicating with a processor; and
   the processor, when executing a computer program, is configured to:
      identify a first authorization request associated with a payment account, where said first authorization request was declined for a first purchase transaction for failing to comply with at least one of an account-level and a corporate-level use restriction associated with said payment account;
      create, in response to said declined first authorization request, a manual authorization record for said payment account and said first purchase transaction based on information associated with or resulting from said first authorization request; and,
      temporarily override said at least one of an account-level and a corporate-level use restriction and allowing approval of a second authorization request involving said payment account and a second purchase transaction that complies with terms of said manual authorization record, including matching at least a portion of information from said first authorization request.

8. The apparatus of claim 7, wherein said payment account is associated with a purchasing card issued to a purchasing entity having a program administrator.

9. The apparatus of claim 8, wherein said manual authorization record is created in response to a request by said program administrator.

10. The apparatus of claim 7, wherein said payment account is associated with at least one of a merchant category code (MCC), account-level, corporate-level, and standard industrial code (SIC) authorization controls.

11. The apparatus of claim 10, wherein said first authorization request is declined based on a failure of said prior first purchase transaction to comply with said at least one of MCC, account-level, corporate-level, and SIC authorization control.

12. A tangible computer-readable medium having computer-executable instructions stored thereon that, if executed by a computer, cause the computer to perform a method comprising:

identifying a first authorization request associated with a payment account, where said first authorization request was declined for a first purchase transaction for failing to comply with at least one of an account-level and a corporate-level use restriction associated with said payment account;

creating, in response to said declined first authorization request, a manual authorization record for said payment account and said first purchase transaction based on information associated with or resulting from said first authorization request; and, temporarily overriding said at least one of an account-level and a corporate-level use restriction and allowing approval of a second authorization request involving said payment account and a second purchase transaction that complies with terms of said manual authorization record, including matching at least a portion of information from said first authorization request.

13. The medium of claim 12, wherein said payment account is associated with a purchasing card issued to a purchasing entity having a program administrator.

14. The medium of claim 13, wherein said manual authorization record is created in response to a request by said program administrator.

15. The medium of claim 12, wherein said payment account is associated with at least one of merchant category code (MCC), account-level, a corporate-level, and standard industrial code (SIC) authorization controls.

16. The medium of claim 15, wherein said first authorization request is declined based on a failure of said first purchase transaction to comply with at least one of said MCC, said account-level, said corporate-level, and said SIC authorization controls associated with said payment account.

17. The medium of claim 15, wherein said manual authorization record operates to override at least one of said MCC, said account-level, said corporate-level, and said SIC authorization controls associated with said payment account.

* * * * *